(12) United States Patent
Renavikar et al.

(10) Patent No.: US 11,695,873 B2
(45) Date of Patent: Jul. 4, 2023

(54) SYSTEM AND METHOD FOR PROVIDING INTELLIGENT REDIRECTION AND INTELLIGENT NOTIFICATION OF FEATURE ACTIVATION

(71) Applicant: Avaya Management L.P., Durham, NC (US)

(72) Inventors: Isha Renavikar, Pune (IN); Shahana Mogal, Pune (IN); Ananda H P, Pune (IN)

(73) Assignee: Avaya Management L.P., Durham, NC (US)

( * ) Notice: Subject to any disclaimer, the term of this patent is extended or adjusted under 35 U.S.C. 154(b) by 0 days.

(21) Appl. No.: 17/189,573

(22) Filed: Mar. 2, 2021

(65) Prior Publication Data

US 2022/0286558 A1    Sep. 8, 2022

(51) Int. Cl.
*H04M 3/00*     (2006.01)
*H04M 3/54*     (2006.01)

(52) U.S. Cl.
CPC ........................ *H04M 3/54* (2013.01)

(58) Field of Classification Search
CPC ........................................ H04M 3/54
USPC ........................ 379/211.02, 201.01
See application file for complete search history.

(56) References Cited

U.S. PATENT DOCUMENTS

| 4,723,873 A | * | 2/1988 | Masznyik | ........... | F16L 55/1658 |
| | | | | | 405/184 |
| 5,859,902 A | * | 1/1999 | Freedman | ............. | H04M 15/28 |
| | | | | | 379/88.16 |
| 6,510,217 B1 | * | 1/2003 | Welch | ................... | H04M 3/436 |
| | | | | | 379/142.04 |
| 6,587,683 B1 | * | 7/2003 | Chow | .................. | H04W 76/15 |
| | | | | | 455/555 |
| 6,735,433 B1 | * | 5/2004 | Cervantes | ............... | H04M 3/54 |
| | | | | | 455/420 |
| 7,236,485 B2 | | 6/2007 | Lim et al. | | |
| 7,978,686 B2 | | 7/2011 | Goyal et al. | | |

(Continued)

FOREIGN PATENT DOCUMENTS

| EP | 0696146 | | 2/1996 |
| JP | H08293933 | * | 11/1996 |
| JP | WO2006103763 | * | 10/2006 |

*Primary Examiner* — William J Deane, Jr.
(74) *Attorney, Agent, or Firm* — Sheridan Ross P.C.

(57) ABSTRACT

Systems and methods disclosed herein provide intelligent redirection and notification of feature activation. Intelligent redirection includes user configurable rules/conditions for specifying destinations for call redirection. Intelligent redirection may also include notifying the caller of the redirection (including redirection options) and a new destination for the call. Intelligent notification of feature activation includes determining users affected by a feature activation (e.g., target user(s)) and notifying the target user(s) of when the call feature is activated. The intelligent feature notification may also include allowing the target user(s) to accept/reject the activation of the call feature. The intelligent feature notification may further include allowing a user to querying for information related to any call features activated by or on them. In some embodiments, the intelligent feature notification includes receiving an instruction to deactivate the call feature; notifying the target user of the deactivation of the call feature; and deactivating the call feature.

19 Claims, 14 Drawing Sheets

(56) References Cited

U.S. PATENT DOCUMENTS

| | | | | |
|---|---|---|---|---|
| 9,300,806 | B2 | 3/2016 | Salisbury et al. | |
| 2001/0023183 | A1* | 9/2001 | Palviainen | H04W 4/12 |
| | | | | 455/433 |
| 2002/0168060 | A1* | 11/2002 | Huie | H04M 3/38 |
| | | | | 379/188 |
| 2004/0028032 | A1* | 2/2004 | Rantanen | H04M 7/127 |
| | | | | 370/352 |
| 2004/0062376 | A1* | 4/2004 | Woodson | H04M 3/545 |
| | | | | 379/229 |
| 2008/0032689 | A1* | 2/2008 | Kubota | H04L 12/66 |
| | | | | 455/425 |
| 2008/0260136 | A1* | 10/2008 | Rahman | H04L 65/1094 |
| | | | | 379/211.02 |
| 2010/0182994 | A1* | 7/2010 | Rahman | H04L 65/1053 |
| | | | | 370/352 |
| 2011/0110511 | A1* | 5/2011 | Vendrow | H04M 3/42161 |
| | | | | 379/201.04 |
| 2013/0136089 | A1* | 5/2013 | Gillett | H04W 72/048 |
| | | | | 370/329 |
| 2016/0337521 | A1* | 11/2016 | Kim | H04M 3/548 |
| 2021/0227389 | A1* | 7/2021 | Baldwin | H04L 63/0876 |

* cited by examiner

| CALLER ID | CONDITIONAL RULE |
|---|---|
| 303-250-1236 | Redirect to ext 4023 |
| 720-913-5897 | Redirect to mobile/home/spouse; ring in order; 3 rings each |
| 330-550-2653 | If time = 9am – 5pm, then redirect to ext 1250; if time = 5:01pm – 8:59am, then redirect to ext 6450 |
| 212-933-1268 | Redirect to exts 3057/8091; ring simultaneously |
| Unknown/Private | Screen caller |

*Fig. 9*

SYSTEM AND METHOD FOR PROVIDING INTELLIGENT REDIRECTION AND INTELLIGENT NOTIFICATION OF FEATURE ACTIVATION

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for telecommunications and particularly to providing intelligent redirection and notification of feature activation. Intelligent redirection permits specifying specific destinations for specific numbers and other user configurable rules/conditions. In addition, intelligent redirection notifies a caller of the redirection and may provide redirection options to the caller. Intelligent notification of feature activation includes determining users affected by a feature activation (e.g., target user) and notifying the target user of the feature activation.

BACKGROUND

Communication systems offer various features, such as call features, that may be implemented during an active communication session and/or to handle incoming communication sessions. A call feature that may be implemented during an active communication session include transferring the communication session, conferencing in other users to the active communication session, recording the communication session, etc. Other call features are used for routing incoming communication sessions. For example, a user can administer call forwarding/redirection for incoming calls (e.g., activate call-forwarding on their extension), to forward all calls to the specified destination. One enhancement to call-forwarding is the ability to specify different destinations. For example, internal callers can be forwarded to one destination (e.g., user's mobile number) and external callers can be forwarded to another destination (e.g., a colleague).

SUMMARY

Today when user activates certain call features (e.g., call forwarding, bridge, and similar features) other users affected by the activation of these features may not be aware of the feature activation. For example, User A activates call-forwarding to forward their calls to User B. User B unaware the call-forwarding feature was activated by User A starts getting calls meant for User A and may not be expecting the calls and/or does not know how to handle these calls. This results in a poor user experience for both User A and User B. In User A's case, their forwarded calls may be mishandled or ignored all together, and in User B's case the unexpected call-forwarding may catch him unprepared.

Also, since User B is not aware of User A activation of the call-forwarding feature with User B as the destination, there is a possibility that User B will activate call-forward/coverage with User A as the destination creating a loop. All these issues can be avoided if User B is notified of User A's feature activation. In another example, User A may activate call-forwarding to User B, who has set up call-forwarding to User C, although User B may have informed User C that User B's calls will be forwarded, unknown to both Users B and C, User A's calls are being forwarded to User B, and in turn forwarded to User C. Additionally, User A may wish to be notified that their calls are now being forwarded to User C for handling. For example, when User A is notified of the call-forwarding implemented by User B, he may deactivate/change his call-forwarding instructions.

In another example, if User A adds a bridge appearance/team button/busy indicator for User B, currently User B does not get any notification of a bridge/monitoring station present for her. Now suppose User B wants to make a private/personal call, User B will not be able to do it as User A will be notified about User B's activity and in case of bridge, User A may also listen in on the private call. This results in a serious invasion of privacy on User B's end. However, if User B is aware of the bridge/monitoring station, she may activate an exclusion feature.

Currently users may only be aware of call features they activate (e.g., when they are the initiator of the call feature). In other words, a user is not notified when they are the target, but not the initiator, of the call feature. There are several advantages providing users with a notification about activated call features that are not activated by them, but that affect them. Additionally, notification of call redirection to the destination can be offered as a value-added service by any network operator/vendor to the users and it can work vendor to vendor where in the operators can monetize for inter vendor call redirection notification. Additionally, callers may appreciate being notified of call redirection and being offered options regarding the same.

In some embodiments, users may be using mobile devices, intelligent call feature notifications may be provided as a mobile app notification in the mobile device's notification center or provided via a Short Message Service (SMS) or voice message when a call feature is activated on the user, and for other communication devices (e.g., hard phones) notifications may be displayed on the device's screen, which can then be acknowledged/rejected by a button press. Additionally, User B can also be provided with an option to see call features that have been activated that affects them (e.g., they are the target user of the call feature). For example, User B may want to view a list of all users/numbers that are redirecting their calls to him on his mobile phone. User B may request this information via a SMS or mobile app. For example, User B may send "Query" to a specified number. For desk phones, there can be a button or combination of buttons pressed to retrieve the requested information. Also, an affected user may be given an option to either accept/reject a call feature activated that targets them before the feature is activated.

The present disclosure provides notifications to a target user(s) for whom the feature was activated (e.g., if User A activated call-forwarding with User B as the destination, User B will receive a notification that call-forwarding was activated for User B by User A). It will similarly apply to other features where a secondary user/extension is involved. In this way, a loop or an unintentional feature activation becomes easier to detect. Additionally, the call feature (e.g., call-forwarding) may not be activated if User B rejects the call feature when notified.

Furthermore, although a user may specify one call-forwarding destination for external calls and another call-forwarding destination for internal calls, users may desire setting call-forwarding destinations with a higher level of granularity. For example, if User A cannot answer any calls coming to her mobile and wants to forward the call from her colleague Tom to another colleague, but forward a personal call from a friend Harry to her spouse. Current systems do not permit selecting different destinations for different callers, as only a single destination may be selected for external calls, if both the call from Tom and the call from Harry are from external numbers, call-forwarding to a single destination will either lead to the call from Tom reaching the spouse or the call from Harry being redirected to a colleague.

The present disclosure provides an option to the user to be able to provide a redirection destination per caller. This way, the user can provide a colleague's number as the destination for the call from Tom, and the spouse's number as the call forward destination for the call from Harry while activating call forward.

The present disclosure provides systems and methods to provide separate call diversion rules and/or advanced calling conditions based on multiple user-configurable parameters (e.g., caller-ID, time of day, date range etc.) for call redirection (e.g., SAC/Call forward/Coverage/EC500/etc.). In some embodiments, multiple numbers may be selected as a destination for call-forwarding, with each number rang simultaneously, or in a specified order. Additionally, or alternatively, a user may change call-forwarding destinations to different numbers and/or adjust the forwarding order at any time. For example, the user may access their account via a web browser or via a mobile app on their mobile device. Additionally, a caller is also notified of the call redirection and may be provided with redirection options.

Users may also set the number of times a phone rings before the call is diverted to another device/number. For example, a user may specify a call from an unknown number is forwarded and allowed to ring five times before the next number is tried. In contrast a call from the user's supervisor is forwarded after two rings. The user may further set separate call diversion rules for after-hours calls, or advanced calling conditions such as date range, caller ID, or freephone numbers. For example, a user may set call forwarding for two weeks while he is on vacation. For the first week, a first colleague is specified as the destination, however, the first colleague is out during the second week of the user's vacation, so the user specifies a second colleague for the second week. Users may additionally create and select among groups as destinations for forwarded calls. Additionally, or alternatively, whenever a call gets redirected, the caller can be given a notification about the call being redirected with the destination details so that the caller can decide if he/she wants to continue with the call.

The present disclosure also provides an option to screen telemarketers and cold calls by having callers announce themselves first. The callee can then choose to reject incoming calls from unrecognized callers.

These and other needs are addressed by the various embodiments and configurations of the present invention. The present invention can provide a number of advantages depending on the particular configuration. These and other advantages will be apparent from the disclosure of the invention(s) contained herein.

In one embodiment, a system is disclosed, comprising: a processor, wherein the processor comprises at least one processing device; and a data storage comprising a storage device, wherein the processor is configured to: receive, from a first user, first instructions to activate a call feature; determine if the call feature affects a second user; in response to determining that the call feature affects the second user, notify the second user of the activation of the call feature; and activate the call feature.

In another embodiment, a method is disclosed, comprising receiving, from a first user, first instructions to activate a call feature; determining if the call feature affects a second user; in response to determining that the call feature affects the second user, notifying the second user of the activation of the call feature; and activating the call feature.

In another embodiment, a non-transitory computer-readable medium comprising processor-executable instructions, the processor-executable instructions when executed by a processor cause the processor to receive, from a first user, first instructions to activate a call feature; determine if the call feature affects a second user; in response to determining that the call feature affects the second user, notify the second user of the activation of the call feature; and activate the call feature.

Aspects of the present disclosure include the processor is further configured to: receive second instructions to deactivate the call feature; notify the second user of the deactivation of the call feature; and deactivate the call feature.

Aspects of the present disclosure include the call feature comprises a first call-forwarding feature, the first call-forwarding feature indicates the second user as a destination for the call-forwarding feature, and the processor is further configured to: receive a call directed to the first user; determine that the first call-forwarding feature is activated; and in response to determining that the first call-forwarding feature is activated, forward the call directed to the first user to the second user.

Aspects of the present disclosure include the processor is further configured to: receive a query for all active call features activated on the second user; determine all the active call features activated on a particular user; and provide call feature information related to all the active call features activated on the particular user.

Aspects of the present disclosure include the processor is further configured to: while the first call-forwarding feature is activated, receive, from the second user, third instructions to activate a second call-forwarding feature, wherein the second call-forwarding feature indicates a third user as a destination for the second call-forwarding feature; notify the first user and the third user of the second call-forwarding feature; and activate the second call-forwarding feature.

Aspects of the present disclosure include the processor is further configured to: receive an acceptance/rejection regarding the activation of the call feature.

Aspects of the present disclosure wherein the call feature comprises one of a bridge/team or busy-indicator feature.

In one embodiment, a system is disclosed, comprising: a processor, wherein the processor comprises at least one processing device; and a data storage comprising a storage device, wherein the processor is configured to: receive, from a user, redirection instructions that specify at least one rule for redirecting calls directed to the user; receive a call directed to the user; in response to receiving the call directed to the user, process the at least one rule for redirecting calls directed to the user to determine at least one destination for the call directed to the user; and route the call to the at least one determined destination.

In another embodiment, a method is disclosed, comprising receiving, from a user, redirection instructions that specify at least one rule for redirecting calls directed to the user; receiving a call directed to the user; in response to receiving the call directed to the user, processing the at least one rule for redirecting calls directed to the user to determine at least one destination for the call directed to the user; and routing the call to the at least one determined destination.

In another embodiment, a non-transitory computer-readable medium comprising processor-executable instructions, the processor-executable instructions when executed by a processor cause the processor to: receive, from a user, redirection instructions that specify at least one rule for redirecting calls directed to the user; receive a call directed to the user; in response to receiving the call directed to the user, process the at least one rule for redirecting calls directed to the user to determine at least one destination for the call directed to the user; and route the call to the at least one determined destination.

Aspects of the present disclosure wherein the redirection rules include at least one of: a specific destination based on a caller-ID, multiple destinations rang simultaneously, multiple destinations rang in sequence, a time-of-day rule, and after-hours rule, a date range, and/or a number of rings rule.

Aspects of the present disclosure include providing an indication to a caller of the call that the call is being redirected, wherein the indication identifies a new destination of the call.

Aspects of the present disclosure include receiving an input from the caller indicating the redirection is rejected; and in response to the input from the caller that the redirection is rejected, routing the call to a voicemail of the user.

Aspects of the present disclosure further include in response to determining the at least one destination for the call directed to the user, providing an indication to a caller associated with the call, wherein the indication provides the caller with one or more options related to the redirection of the call; receiving an input from the caller indicating a selection of one of the one or more options related to the redirection of the call; and routing the call based on the selection of one of the one or more options related to the redirection of the call by the caller.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 9 depicts a data structure of conditional rules for intelligent redirection in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a subelement identifier when a subelement identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
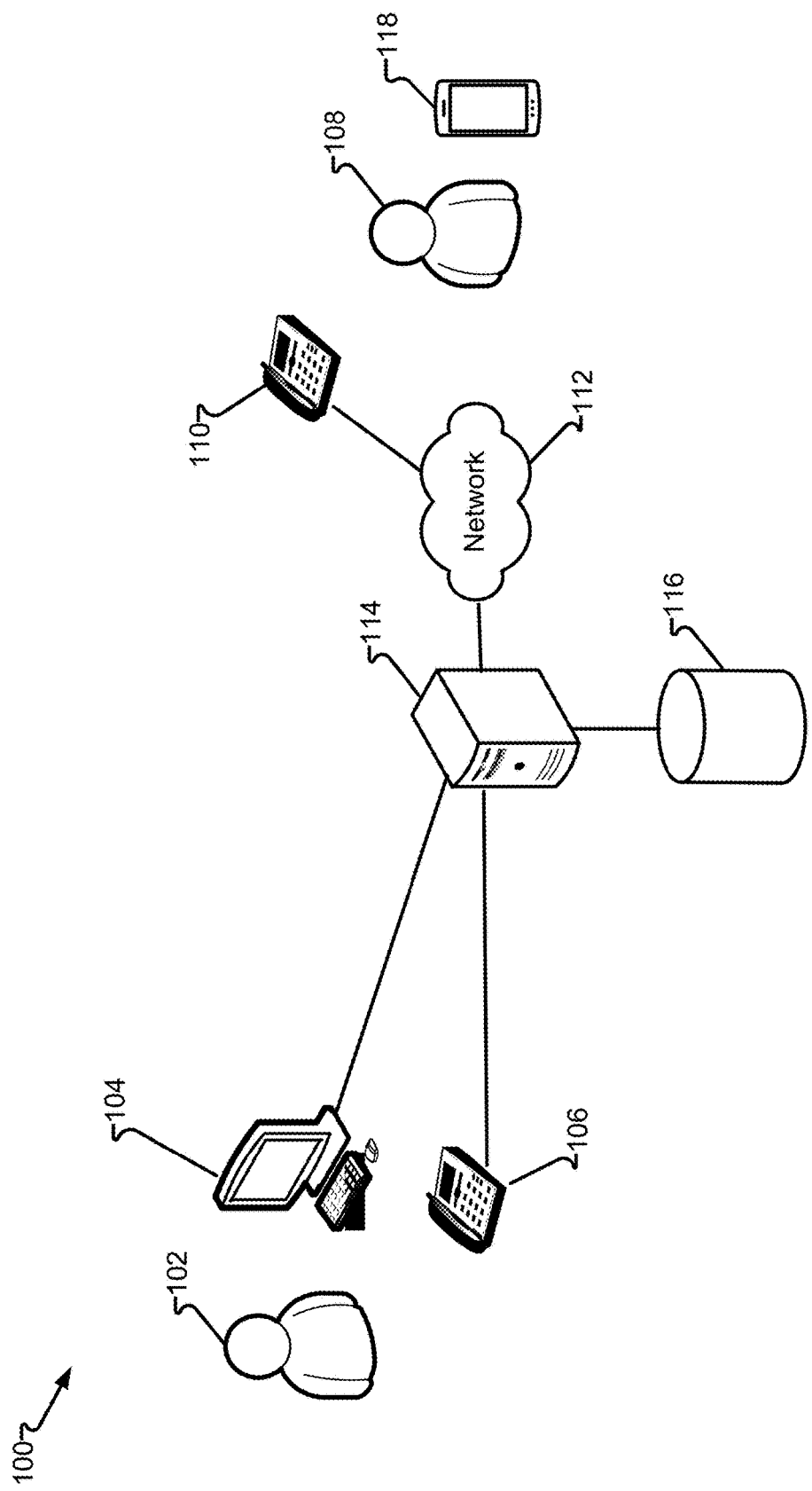
FIG. 1 depicts a first system in accordance with embodiments of the present disclosure.

FIG. 1 depicts system 100 in accordance with embodiments of the present disclosure. In one embodiment, system 100 illustrates components for intelligently configuring a system to provide intelligent redirection and call feature activation notification. It should be appreciated that the components and their particular relationship with other components described herein are provided to promote clarity in describing the embodiments and not as a limitation.

In one example, a user 102 provides instructions to activate a call feature on a user 108. For instance, the user 102 may activate a call feature such as call-forwarding, bridge/team, exclusion, etc. via a terminal 104 or a phone 106 on the user 108. The instruction is sent to server 114, which may include a SIP session manager and/or an EPAX/Switching/B2BA server. It should be appreciated that the server 114 may comprise a plurality of computing and connectivity components, which may be segregated by function, geography, security, or other attribute. Additionally, or alternatively, the server 114 may be incorporated into other components, such as a computing device configured for use for other purposes (e.g., texting, word processing, etc.), which may include incorporation with or into a communication endpoint, such as the terminal 104 and/or the phone 106.

A data storage 116 maintains data (e.g., data structures, instructions for execution by a processor, etc.) which may also be a separate storage device, or a storage device incorporated with or into other storage device(s), such as the server 114 or other storage component. For example, the data storage 116 may storage instructions received from the user 102 or 108 regarding various call features (e.g., data structures 510 and 910 illustrated in FIGS. 5 and 9, respectively). In another embodiment, the server 114 and/or the data storage 116 may be a portion of a shared computing and/or storage device, appliance, circuitry, and/or combination thereof, which maybe dedicated to a particular task or user or shared (e.g., storage or computing array, farm, "cloud," etc.). The server 114 may comprise one or more microprocessors (e.g., cores, blades, appliances, etc.) (herein, "processor") having machine-executable instructions to configure the processor. The server 114 may also have networking interfaces, or be in communication with networking interfacing components (e.g., switches, ports, routers, edge devices, etc.) for the management of communication connectivity and facilitating communications between components (e.g., a telephone or other device 110, a terminal 104, a phone 106, etc.)

The server 114 determines if the call feature activated by the user 102 affects another user. For example, the user 102 may set up call forwarding to have the calls for the user 102 forwarded to the user 108, so the call forwarding set up by the user 102 affects the user 108. In response to determining that the call feature affects another user (e.g., the user 108), the server 114 sends a notification to the affected user(s) (e.g., the user 108) regarding the activation of the call feature. The server 114 also activates the call feature. For example, the user 108 may receive a notification via the device 110. In other examples, the user 108 may receive a notification via his mobile device 118. In some embodiments, the notification received by the user 108 includes the option for the user 108 to accept/reject the activation of the call feature. Additionally, a user may query the server 114 for any call features associated with them. For example, the user 108 may wish to see what call features are activated on them (e.g., their devices, their extension, etc.). The user 108 may query the server 114 to retrieve this call feature information. This query feature is further illustrated in FIG. 5.

If and/or when a call directed to the user 102 is received, the server 114 will forward the call to the user 108. For example, the device 110 may receive the call directed to the user 102. Additionally, or alternatively, a caller associated with the call may be given information regarding the redirection (e.g., information regarding the new destination). The information regarding the redirection may further include providing the caller with various options for the redirection. For example, the caller may be given a choice to reject the redirection and be sent to the voicemail of the original callee. In another example, the caller may be given several options for redirection (e.g., callee's mobile device, another extension, etc.). If and/or when the user 102 wishes to deactivate the call feature, a similar process for deactivation may be performed. For example, the user 102 sends instructions via the terminal 104 or the phone 106 to deactivate the call feature activated on the user 108. The server 114 receives the instructions to deactivate the call feature (e.g., call-forwarding) on the user 108. One or both of the users 102 and 108 may be notified when the call feature is deactivated.

Figure 2:
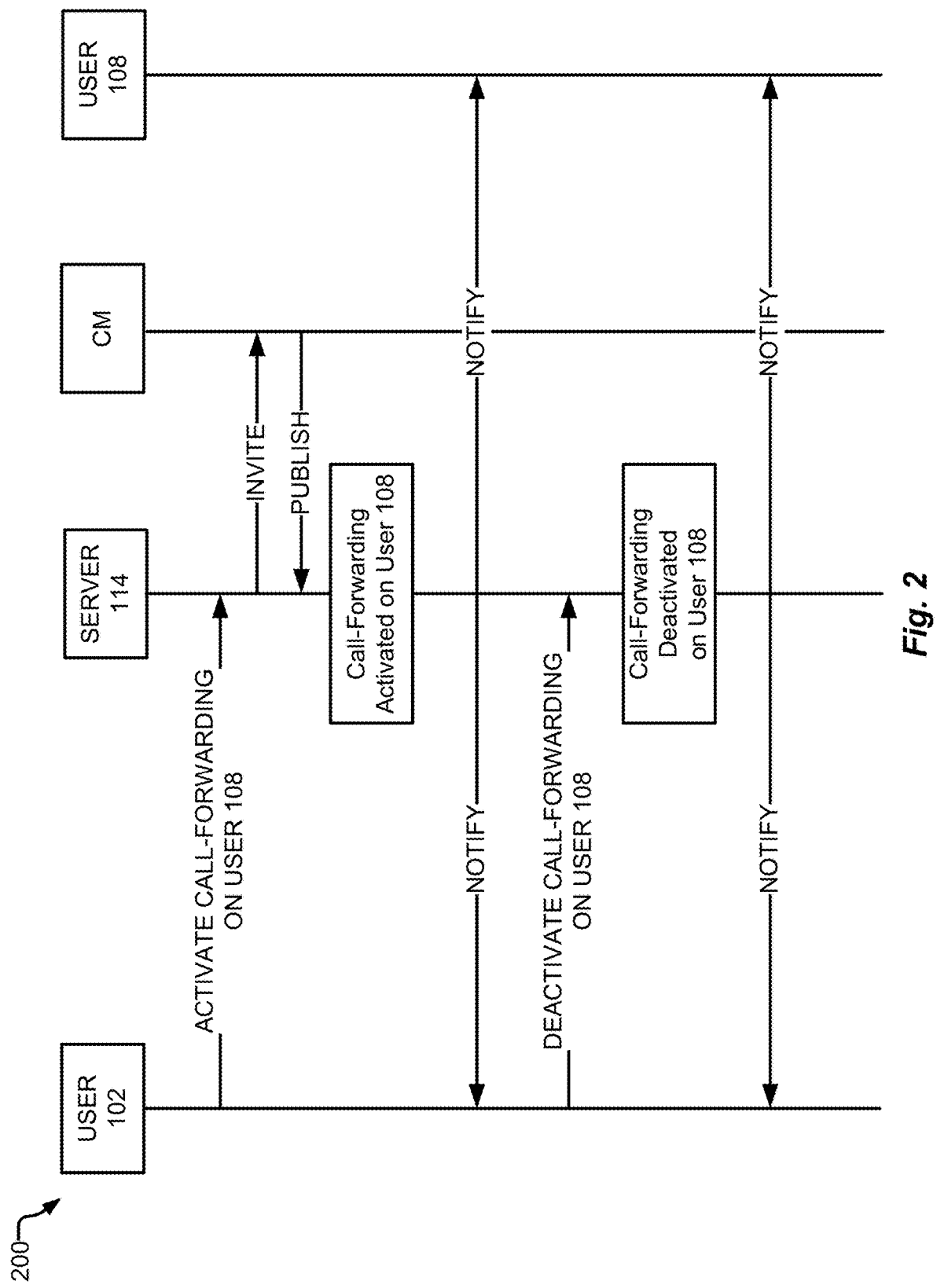
FIG. 2 depicts a signaling/message flow for intelligent call feature activation in accordance with embodiments of the present disclosure.

FIG. 2 depicts a sequence diagram 200 in accordance with embodiments of the present disclosure. As illustrated in FIG. 2, the user 102 provides instructions to activate call-forwarding to have the calls for the user 102 forwarded to the user 108. The server 114 sends the invite for the call-forwarding to a communication manager (CM), which publishes the call-forwarding feature, after which the call-forwarding feature is activated on the user 108. In response to determining that the call feature affects another user (e.g., the user 108), the server 114 sends a notification to the affected user(s) (e.g., the user 108) regarding the activation of the call feature. The server 114 may also notify the user 102 that the call feature has been activated. In some embodiments, the user 108 is notified of the call feature before the call feature is activated. Additionally, when the user 108 is notified regarding the call feature, the user 108 may reject/accept the call feature. The server 114 also activates the call feature. Subsequently, the user 102 sends instructions to deactivate the call-forwarding on the user 108. The server 114 receives the instructions to deactivate the call feature (e.g., call-forwarding) on the user 108. One or both of the users 102 and 108 may be notified when the call feature is deactivated.

Figure 3:
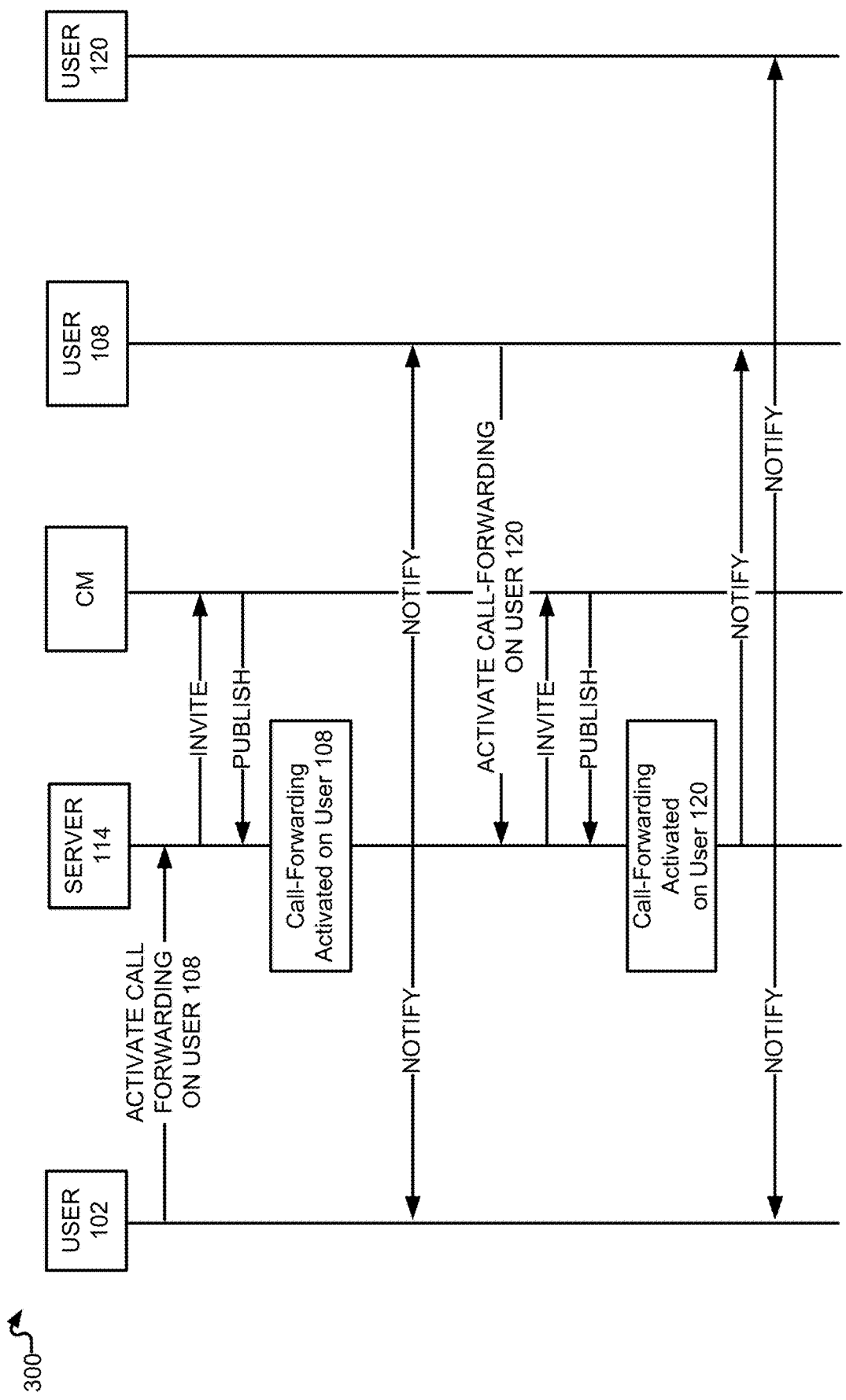
FIG. 3 depicts another signaling/message flow for intelligent notification of call feature activation in accordance with embodiments of the present disclosure.

FIG. 3 depicts a sequence diagram 300 in accordance with embodiments of the present disclosure. As illustrated in FIG. 3, the user 102 provides instructions to activate call-forwarding to have the calls for the user 102 forwarded to the user 108. The server 114 sends the invite for the call-forwarding to the CM, which publishes the call-forwarding feature, after which the call-forwarding feature is activated on the user 108. In response to determining that the call feature affects another user (e.g., the user 108), the server 114 sends a notification to the affected user(s) (e.g., the user 108) regarding the activation of the call feature. The server 114 may also notify the user 102 that the call feature has been activated.

Subsequent to the user 102 activating call-forwarding on the user 108, and before the user 102 deactivates the call-forwarding on the user 108, the user 108 activates call forwarding on a third user (e.g., the user 120). Similar to the example discussed above, the server 114 determines which (if any) users are affected by the call feature activation by the user 108. In this case, the users 102 and 120 are affected. The user 102 is affected because their calls are currently being forwarded to the user 108, and the user 120 is affected because they will now be receiving calls meant for both users 102 and 108. The server 114 notifies both users 102 and 120 regarding the call feature activation. Additionally, or alternatively, both users 102 and 120 may accept/reject the call feature activation. For example, if the user 102 rejects the call feature activation, the original call forwarding set up by the user 102 may be deactivated. Additionally, the user 102 may be provided with additional options beyond accept/reject. For example, the user 102 may reject the call feature activation on the user 120 and be provided with an option to indicate a new destination for the call-forwarding.

Figure 4:
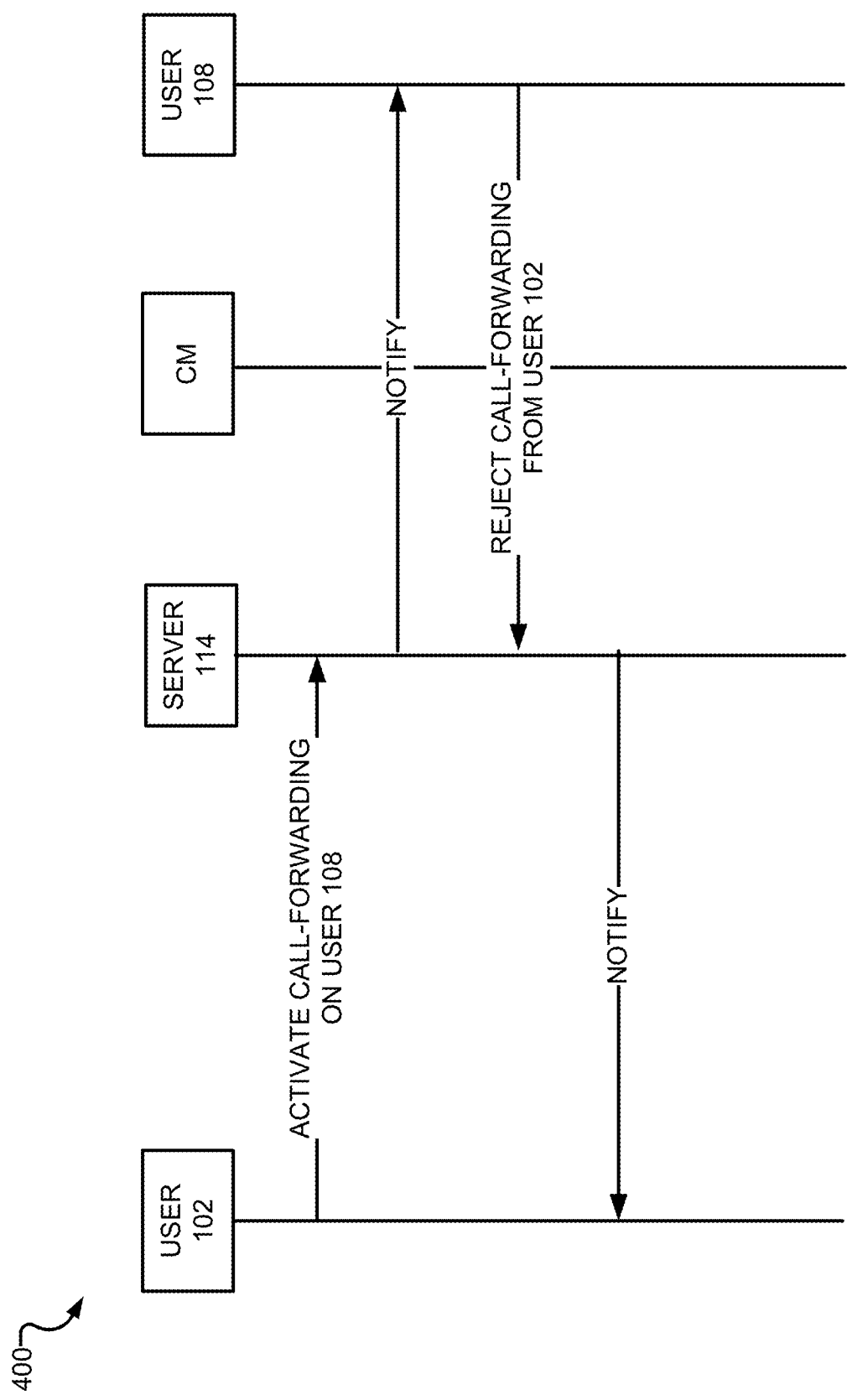
FIG. 4 depicts yet another signaling/message flow for intelligent notification of call feature activation in accordance with embodiments of the present disclosure.

FIG. 4 depicts a sequence diagram 400 in accordance with embodiments of the present disclosure. As illustrated in FIG. 4, the user 102 provides instructions to activate call-forwarding to have the calls for the user 102 forwarded to the user 108. The server 114 determines that the call feature affects another user (e.g., the user 108), and the server 114 sends a notification to the affected user(s) (e.g., the user 108) regarding the activation of the call feature. When the user 108 is notified regarding the call feature, the user 108 may reject/accept the call feature. As illustrated in FIG. 4, the user 108 rejects the activation of the call feature, and the server 114 notifies the user 102 of the rejection, and the call feature is not activated.

Figure 5:
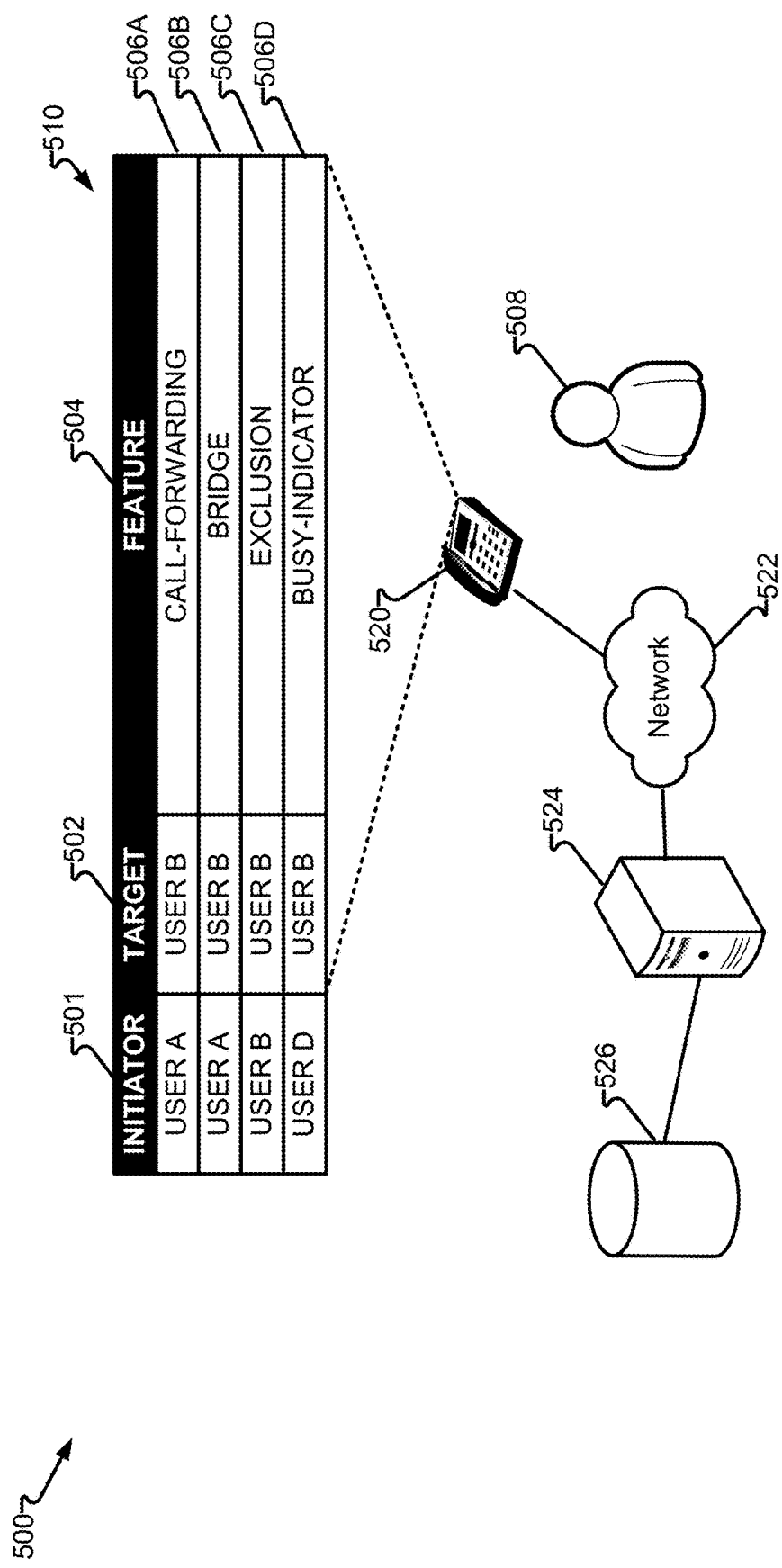
FIG. 5 depicts a second system in accordance with embodiments of the present disclosure.

FIG. 5 depicts a system 500 in accordance with the embodiments of the present disclosure. The system 500 includes user 508 who may use a device 520 to conduct various communication sessions (audio calls, video calls, etc.) The device 520 is connected to the server 524 via the network 522. The server 524 is optionally connected to a data storage 526. In some embodiments a user may query the system for call feature information to determine which (if any) call features are associated with that user (e.g., as an initiator and/or target).

An example data structure 510 including call feature information is illustrated in FIG. 5. A processor, such as a component of server 114/524, may access data structure 510 from a data storage, such as data storage 116/526. The data structure 510 comprises an initiator field 501, a target field 502, and a feature field 504 for each of a number of records 506. The initiator field 501 identifies the user that initiated/activated the call feature. The target field 502 identifies the target of the call feature (e.g., the user the call feature affects). The feature field 504 indicates the call feature that was activated. For example, User A activated call-forwarding and bridge call features on User B (as indicated in records 506A and B). User B may wish to make a personal call while the call-forwarding and bridge call features are activated on him, so he activates an exclusion feature on himself (as indicated in record 506C). Additionally, User D has activated a busy-indicator on User B (as illustrated in record 506D).

Figure 6:
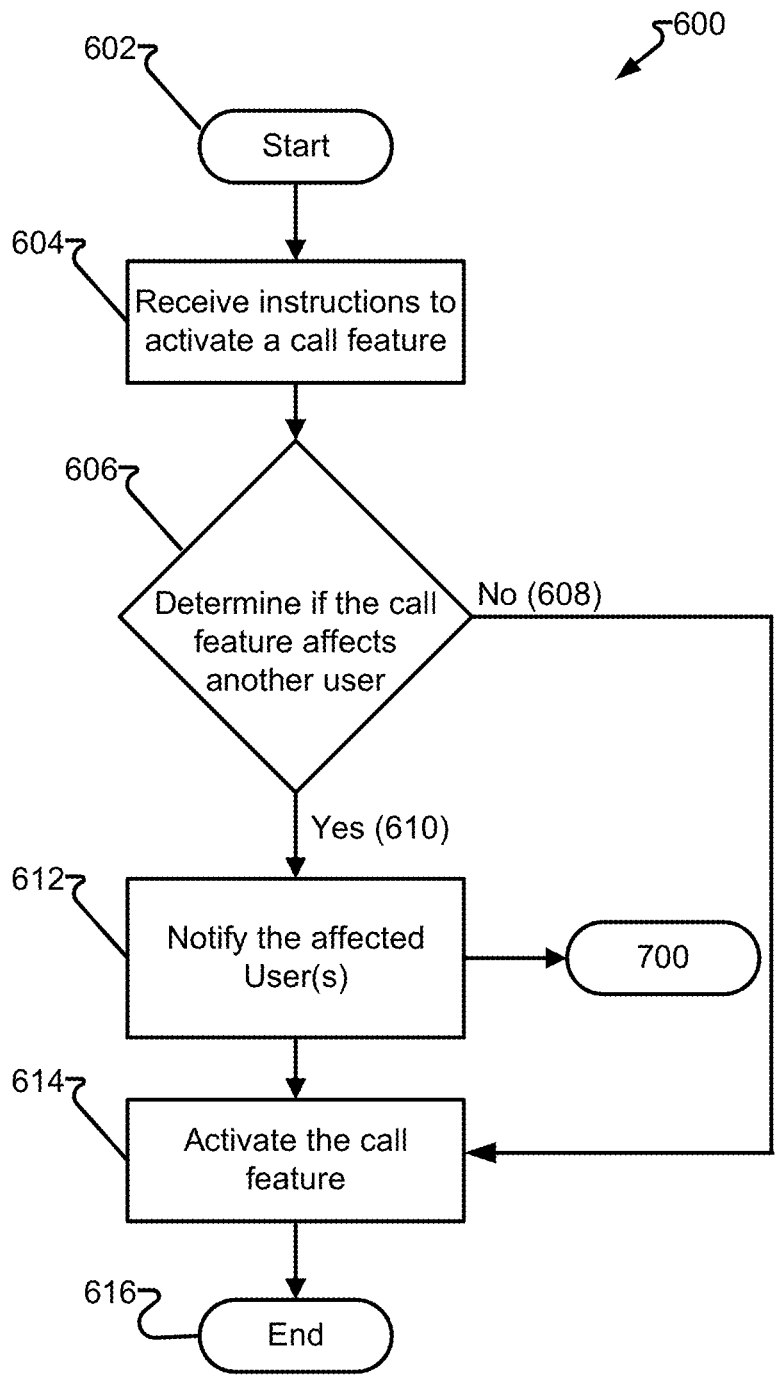
FIG. 6 depicts a process to provide intelligent feature notification in accordance with embodiments of the present disclosure.

FIG. 6 depicts a process 600 in accordance with embodiments of the present disclosure. The process 600 may be embodied as machine-executable instructions for execution by a processor, such as a processor of server 114/524 or other device providing some or all of the services described herein and, optionally, additional services.

In one embodiment, the process 600 begins (Starts) at step 602. In step 604 instructions to activate a call feature are received. For example, a user may activate a call-forwarding feature to forward their calls to another device, user, etc. In step 606, it is determined if the call feature to be activated affects any user other than the user activating the call feature. For example, if the user 102 activates call-forwarding from their desk phone to their mobile phone, no other users are affected (No) Step 608. If no other users are affected by the activation of the call feature, the call feature is activated (Step 614).

In another example, if the user 102 activates call-forwarding on the user 108, the activation of the call feature by the user 102 affects the user 108 (Yes) Step 610. The affected user(s) is notified of the call feature activation Step 612. In Step 614 the call feature is activated, and the process 600 ends in Step 616. Optionally, the process 600 may proceed to a process 700 illustrated in FIG. 7.

Figure 7:
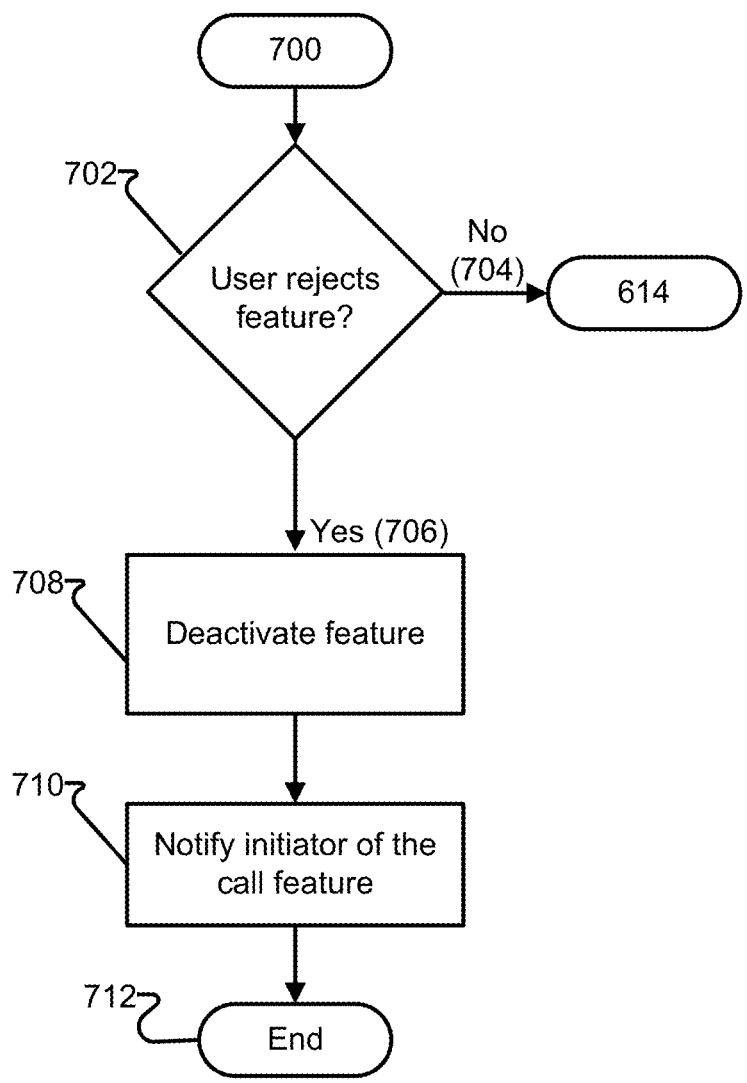
FIG. 7 depicts an additional process to provide intelligent feature notification in accordance with embodiments of the present disclosure.

FIG. 7 depicts a process 700 in accordance with embodiments of the present disclosure. The process 700 may be embodied as machine-executable instructions for execution by a processor, such as a processor of server 114/524 or other device providing some or all of the services described herein and, optionally, additional services.

In one embodiment, the process 700 continues from Step 612 from the process 600. In Step 702, after the affected user(s) receives notification of the activation of the call feature (in Step 612), the user may accept/reject the activation of the call feature (Step 702). If the user accepts (Step 704) the process continues as illustrated in FIG. 6 at Step 614. If the user rejects the activation of the call feature (Step 706), the process 700 continues to Step 708 and the call feature is deactivated. This step may not occur, if the call feature has not yet been activated. In step 710, the initiating user is notified that the call feature has been rejected by the target user. The process 700 ends in Step 712.

FIGS. 8A-D depict various sequence diagrams 800 in accordance with embodiments of the present disclosure.

Figure 8A:
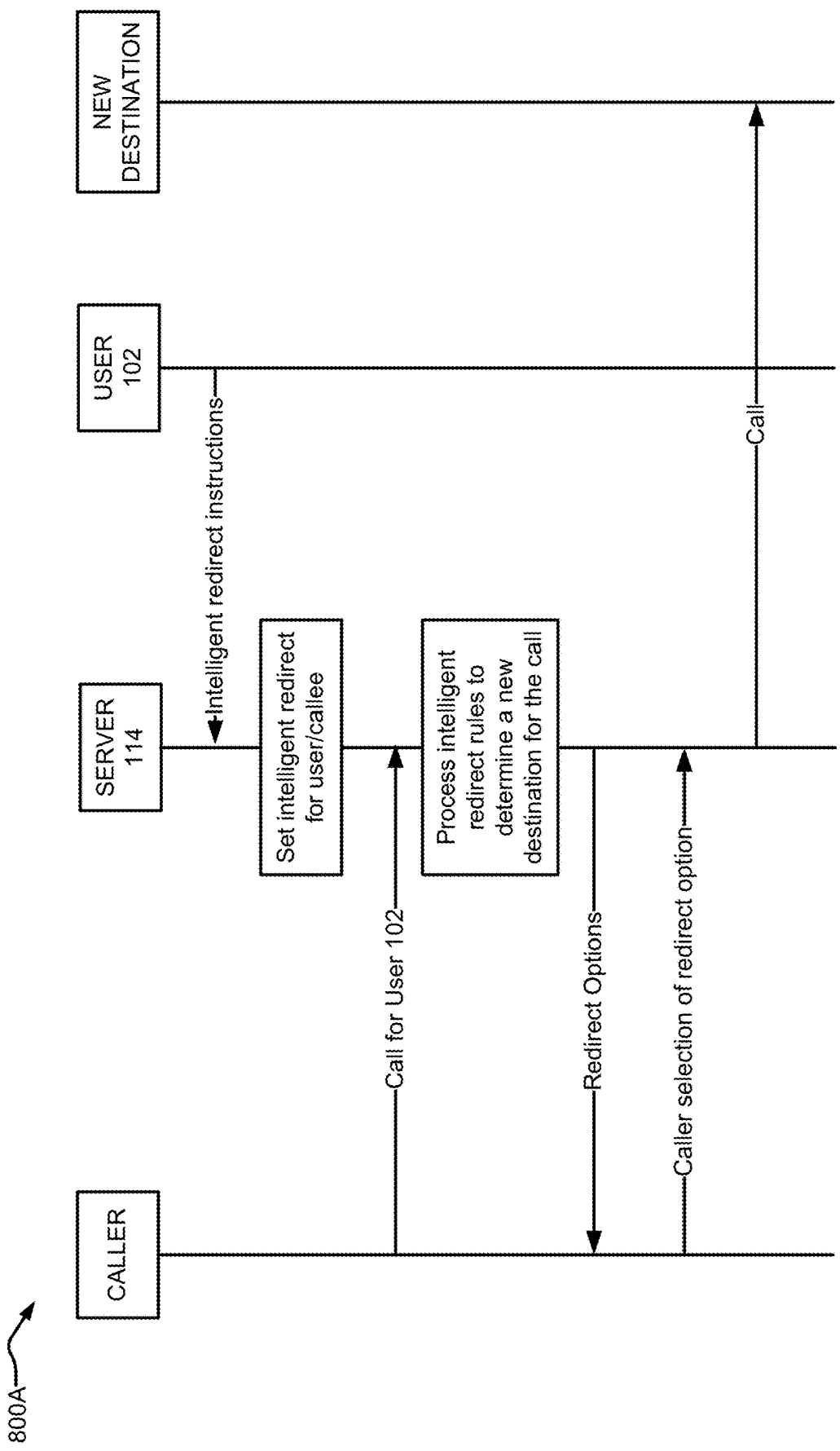
FIGS. 8A-D depict signaling/message flow diagrams for intelligent call redirection in accordance with embodiments of the present disclosure.

FIG. 8A depicts a sequence 800A in accordance with embodiments of the present disclosure. A user 102 sets up intelligent redirection on their device/number. For example, the user 102 may select one more numbers as a destination for call-forwarding, with each number rang simultaneously, or in a specified order. Additionally, or alternatively, a user may change call-forwarding destinations to different numbers and/or adjust the forwarding order at any time. For example, the user may access their account via a web browser or via a mobile app on their mobile device. Users may also set the number of times a phone rings before the call is divert to another device/number. For example, a user may specify a call from an unknown number is forwarded and allowed to ring five times before the next number is tried, in contrast a call from the user's supervisor is forwarded after two rings. The user may further set separate call diversion rules for after-hours calls, or advanced calling conditions such as date range, caller ID, or freephone numbers. The server 114 stores the rules for processing calls directed to the user 102.

A caller attempts to call the user 102, the server 114 processes the stored redirection rules to determine a new destination for the call. In some embodiments, the server 114 may automatically redirect the call according to the redirection rules. In other embodiments, the server 114 may transfer redirection options to the caller (e.g., allow the caller to select the new destination, allow the caller to be sent to voicemail, etc.). The redirection options provided to the caller may be based on the redirection rules set by the user 102. The caller selects the redirection option, and the server 114 forwards the call to the new destination (e.g., voicemail, new extension, the user 102's mobile device, etc.).

Figure 8B:
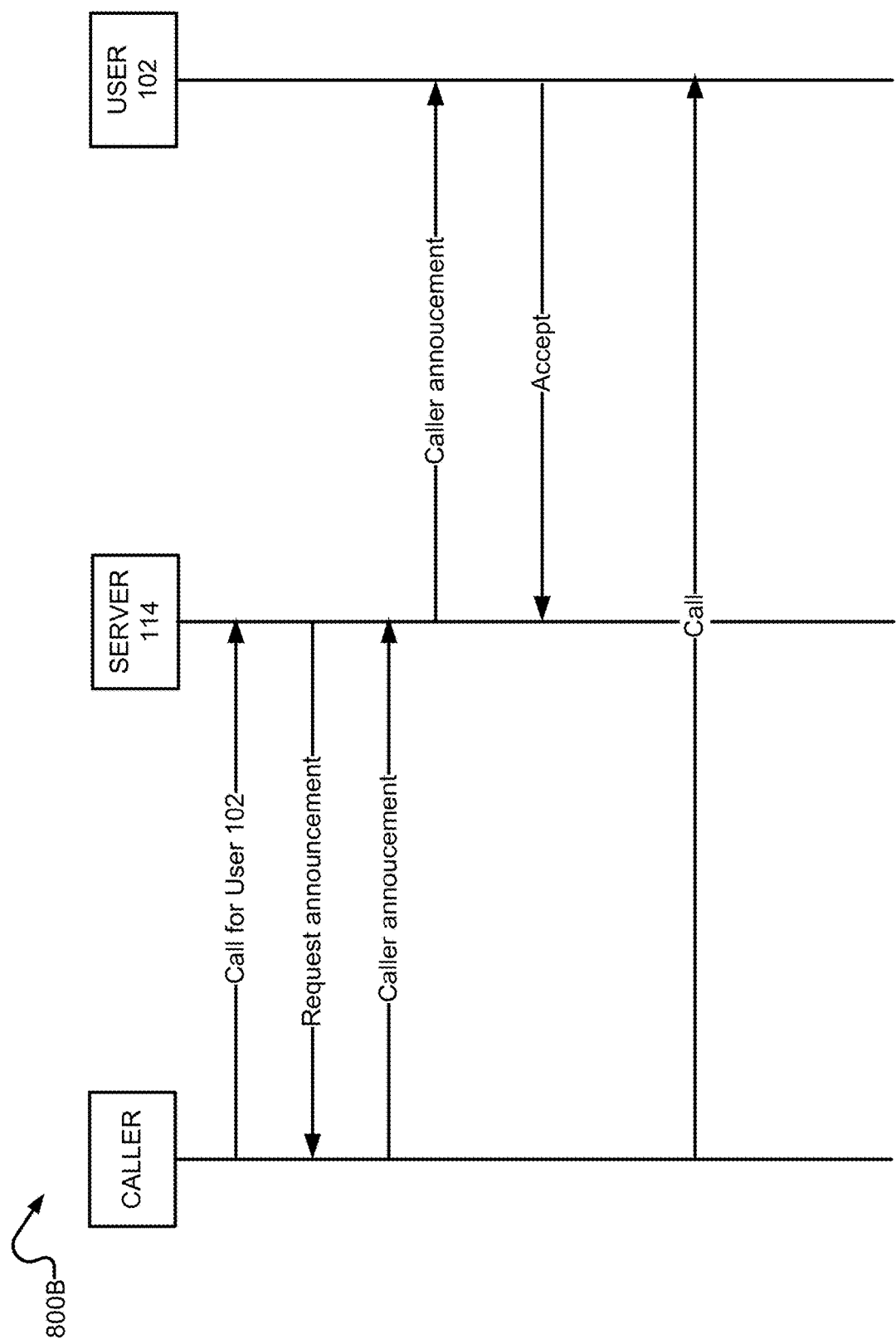
Figure 8C:
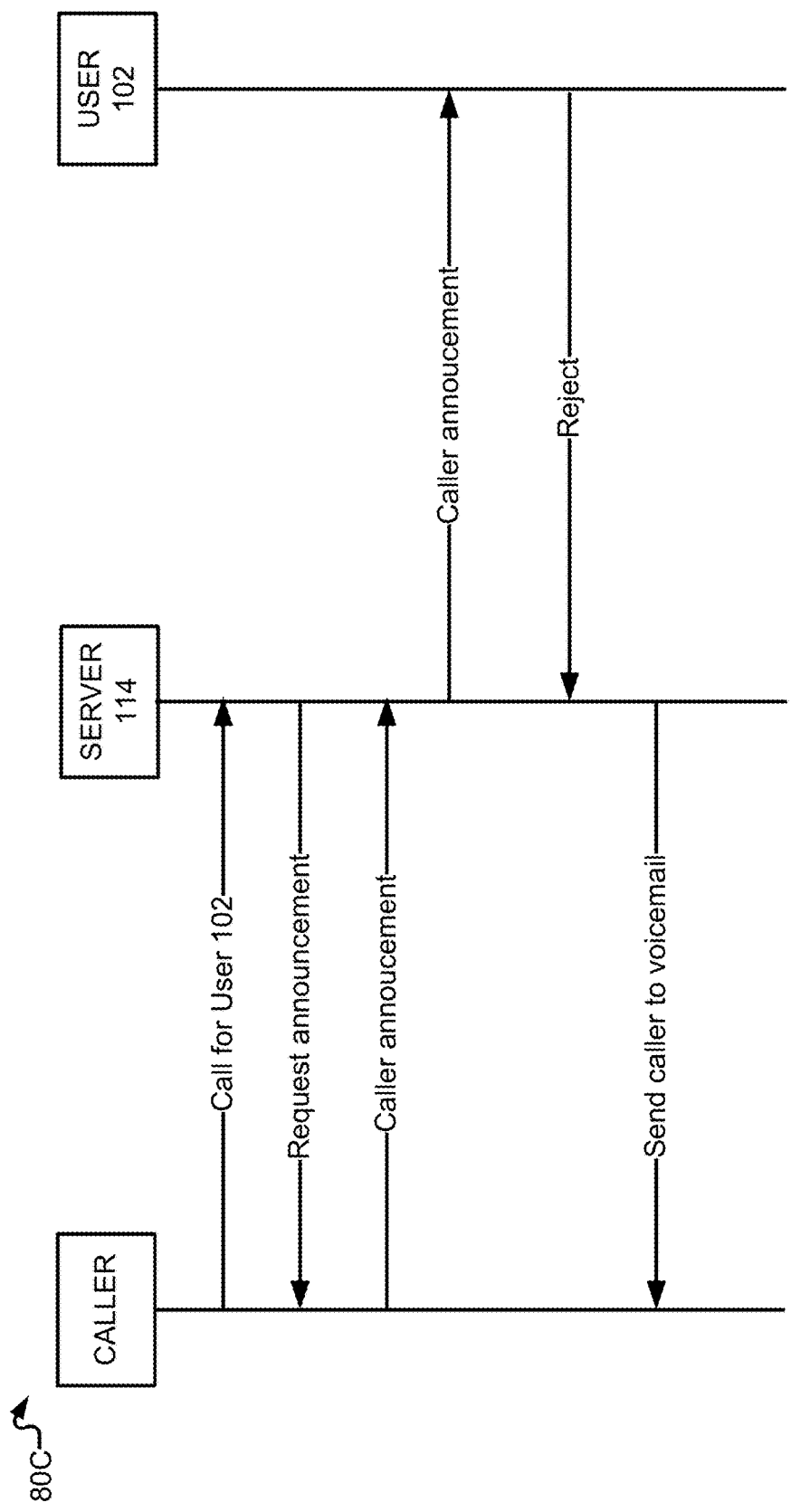

FIG. 8B depicts a sequence 800B in accordance with embodiments of the present disclosure. Sequence 800B is an example sequence to provide a caller announcement to a callee. The caller calls the user 102, the server 114 requests an announcement from the caller. For example, the server 114 may request the caller provide their name, company, etc. The server 114 records the caller speaking the announcement (e.g., their name) and when the user 102 is rang, the announcement is played. The user 102 may reject/accept the call based on the announcement. As illustrated in FIG. 8B, the user 102 accepts the call and the call is forwarded to a device of the user 102. As illustrated in FIG. 8C by a sequence 800C, the user 102 rejects the call and the call is sent to the user 102's voicemail. The user 102 may have additional options such as blocking future calls from the number (if available).

Figure 8D:
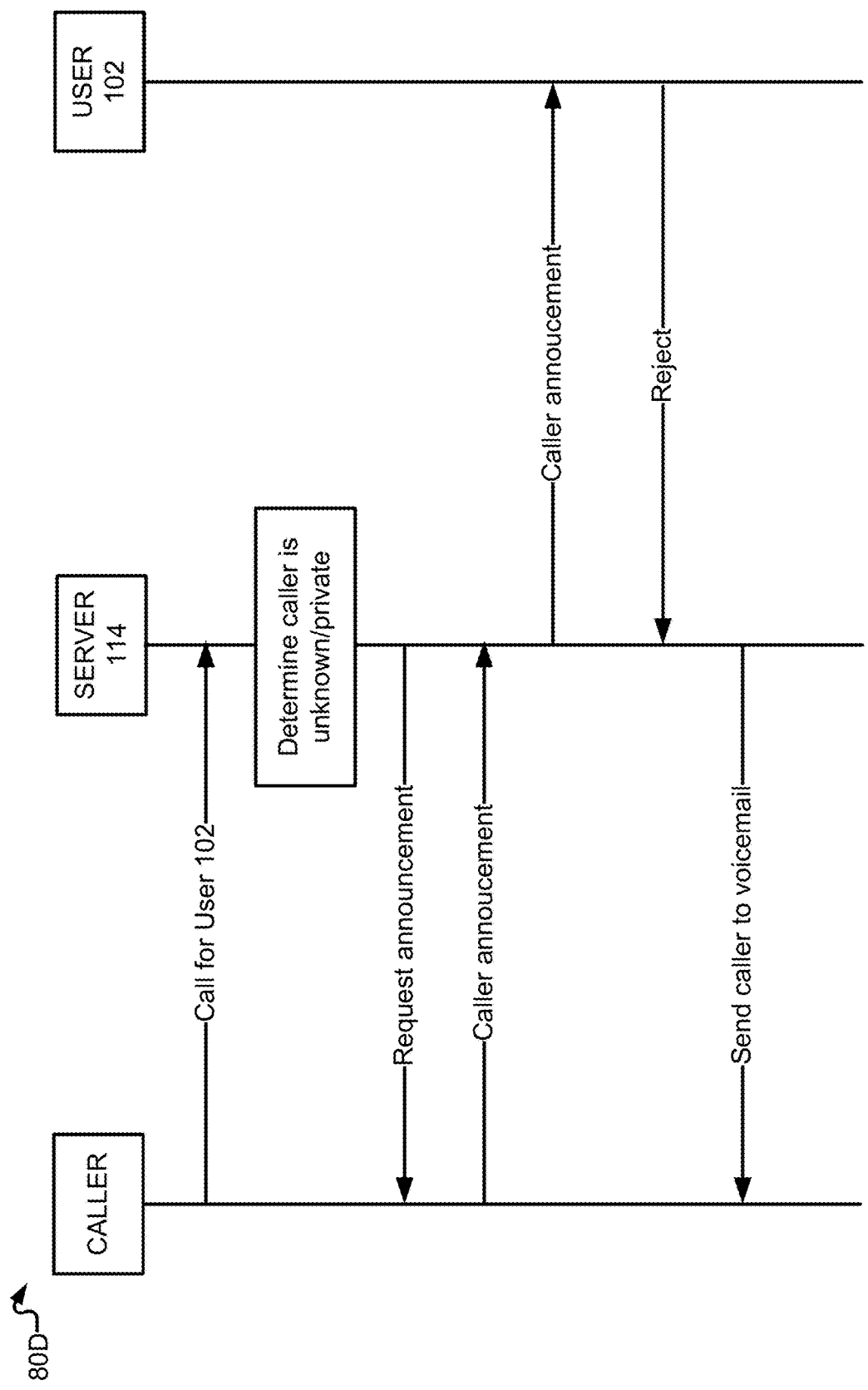

FIG. 8D depicts a sequence 800D in accordance with embodiments of the present disclosure. The sequence 800D is an example sequence to screen unknown/private number (e.g., telemarketers and cold calls) by having callers announce themselves first (Rule 906E). The callee can then choose to reject incoming calls from unrecognized callers. The sequence 800D adds an additional step of determining the call is from an unknown/private number.

FIG. 9 depicts a data structure 910 in accordance with embodiments of the present disclosure. The data structure 910 is an example of a data structure to store conditional rules for intelligent redirection. In one embodiment, the data structure 910 comprises a caller ID field 902 and a conditional rule field 904 for a number of rules 906A-E. For example, a user, such as user 102 may set up various conditional rules 906A-E for redirecting calls. The rule 906A indicates that calls from the number "303-250-1236" should be redirected to extension "4023." The rule 906B indications that calls from the number "720-913-5897" should be redirected to the user 102's mobile, home, and spouse in sequence, with each number being rung 3 times before the next number is called. The rule 906C indicates that calls from the number "303-550-2653" should be redirected based on the time of day. If the time is between 9:00 am and 5:00 pm, then the call is redirected to extension "1250." If the time is between 5:01 pm and 8:59 am, then the call is redirected to extension" 6450," which may be an extension for after-hour calls. The data structure 910 may include more or fewer rules 906 than illustrated.

Figure 10:
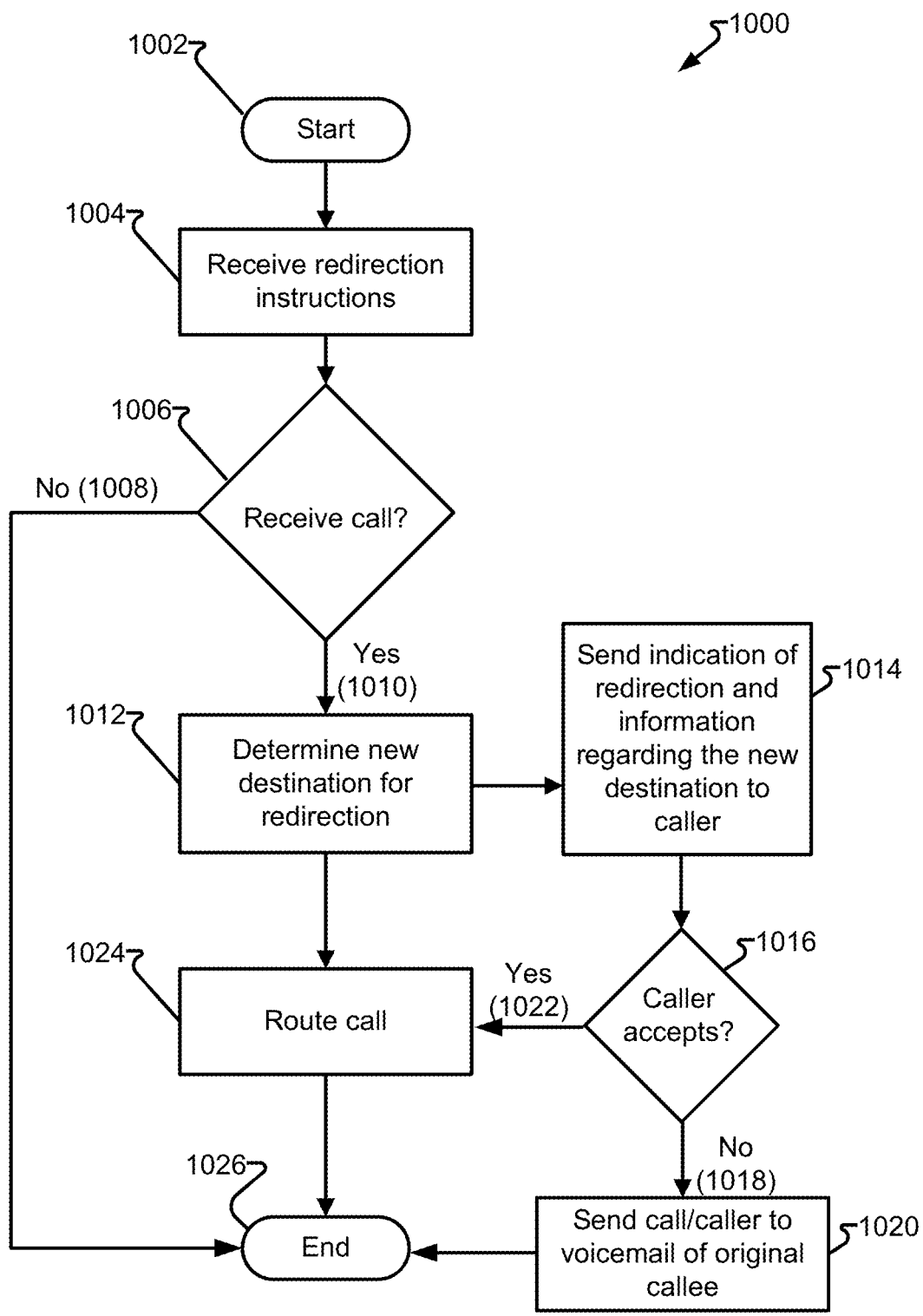
FIG. 10 depicts a process to provide intelligent redirection in accordance with embodiments of the present disclosure.

FIG. 10 depicts a process 1000 in accordance with embodiments of the present disclosure. The process 1000 may be embodied as machine-executable instructions for execution by a processor, such as a processor of the server 114 or other device providing some or all of the telephony services described herein and, optionally, additional services.

In one embodiment, the process 1000 begins at Step 1002. In Step 1004, a user sets up intelligent redirection instructions. For example, the user may set up call-forwarding on their device. In other examples, the user may log onto their account via a web browser to enter intelligent redirection rules. In Step 1006 the system (e.g., a system 100) determines if a call is received for the user. If no call is received (Step 1008: no) the process 1000 ends.

If a call is received (Step 1010: yes), the process 1000 proceeds to Step 1012, and the system determines a new destination for the call based on the redirection instructions received in Step 1004. In Step 1014, the system sends an indication to the caller regarding the redirection. In some embodiments, the indication may inform the caller of the new destination. For example, the caller may hear the message, "Your call is being redirected to extension XXX." In another example, the caller may hear the message, "The user you have called is not available at this number, please select an option for redirection. Please press '1' to be sent to the user's voicemail, press '2' to be transferred to another number that can assist you . . . ."

In Step 1016 it is determined whether the user "accepts" the redirection. If the user "rejects" the redirection (Step 1018: no) the caller may be sent to the voicemail of the user/original callee. If the user accepts the redirection (Step 1020: yes) the call is routed to the new destination in Step 1024. The process 1000 ends with Step 1026. In some embodiments, Steps 1014, 1016, and 1020 may be omitted.

Figure 11:
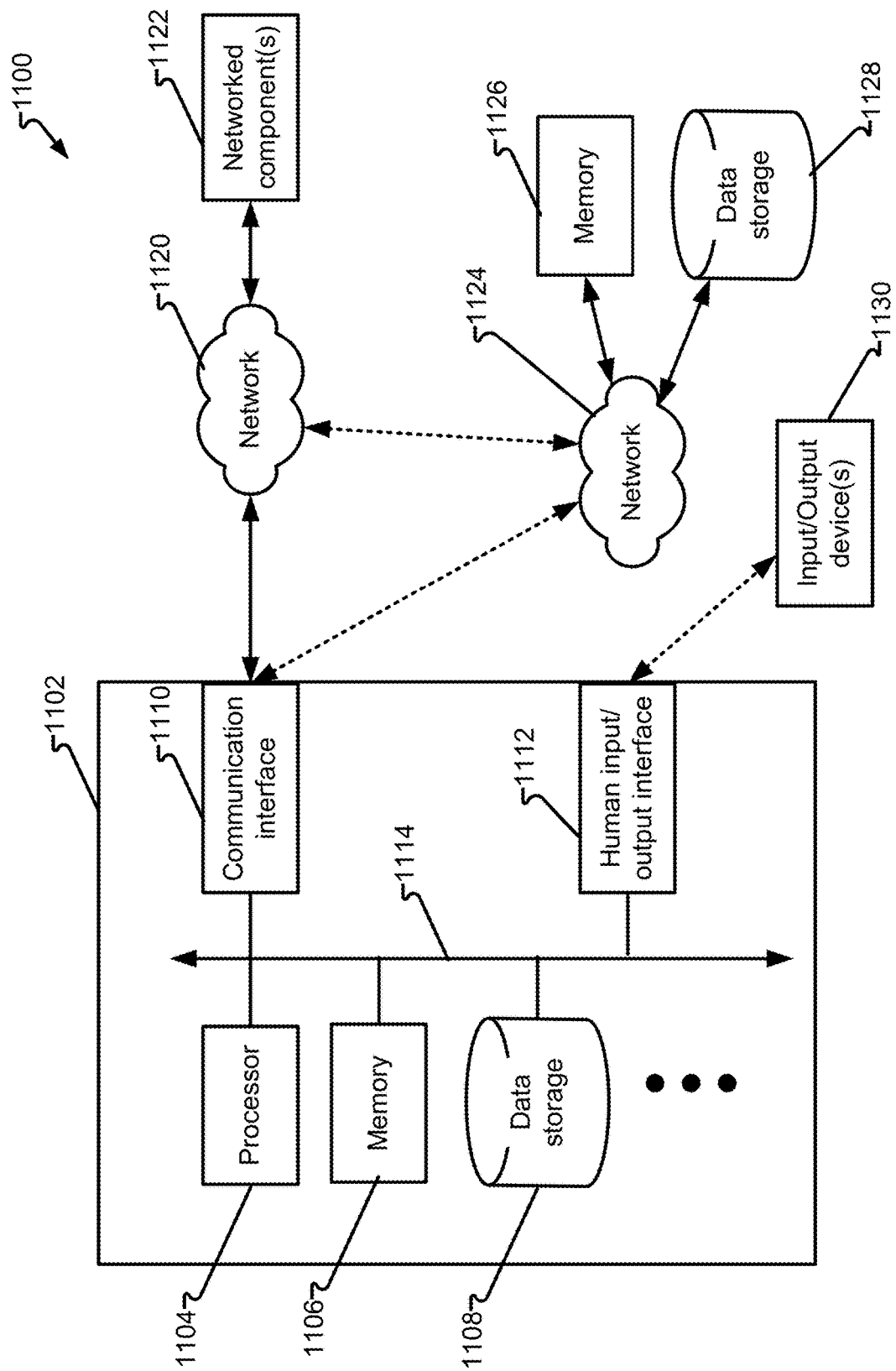
FIG. 11 depicts a block diagram of a computing system to perform the perform the method described herein in accordance with embodiments of the present disclosure.

FIG. 11 depicts a system 1100 in accordance with embodiments of the present disclosure. In one embodiment, a terminal 104, a phone 106, a server 114, or a telephony device comprising one or more thereof may be embodied, in whole or in part, as a device 1102 comprising various components and connections to other components and/or systems. The components are variously embodied and may comprise a processor 1104. The processor 1104 may be embodied as a single electronic microprocessor or multi-processor device (e.g., multicore) having therein components such as control unit(s), input/output unit(s), arithmetic logic unit(s), register(s), primary memory, and/or other components that access information (e.g., data, instructions, etc.), such as received via a bus 1114, executes instructions, and outputs data, again such as via the bus 1114.

In addition to the components of the processor 1104, the device 1102 may utilize a memory 1106 and/or a data storage 1108 for the storage of accessible data, such as instructions, values, etc. A communication interface 1110 facilitates communication with components, such as the processor 1104 via the bus 1114 with components not accessible via the bus 1114. The communication interface 1110 may be embodied as a network port, card, cable, or other configured hardware device. Additionally, or alternatively, a human input/output interface 1112 connects to one or more interface components to receive and/or present information (e.g., instructions, data, values, etc.) to and/or from a human and/or electronic device. Examples of input/output devices 1130 that may be connected to the input/output interface 1112 may include, but are not limited to, a keyboard, mouse, trackball, printers, displays, sensor, switch, relay, etc. In another embodiment, the communication interface 1110 may comprise, or be comprised by, the human input/output interface 1112. The communication interface 1110 may be configured to communicate directly with a networked component or utilize one or more networks, such as a network 1120 and/or network 1124.

The network 112 may be embodied, in whole or in part, as the network 1120. The network 1120 may be a wired network (e.g., Ethernet), wireless (e.g., Wi-Fi, Bluetooth, cellular, etc.) network, or combination thereof and enable device 1102 to communicate with network component(s) 1122. Additionally, or alternatively, the network 1120 may be or comprise a telephony network (e.g., cellular telephone network, public switched telephone network (PSTN), private branch exchange (PBX), etc.). Accordingly, one or more other networks may be utilized. For example, the network 1124 may represent a second network, which may facilitate communication with components utilized by the device 1102.

For example, the network 1124 may be an internal network to a company, or other entity (e.g., academic entity, non-profit entity, building or other trusted space, etc.) whereby components are trusted (or at least more so) that the networked components 1122, which may be connected to the network 1120 comprising a public network (e.g., Internet) that may not be as trusted. Components attached to the network 1124 may include the memory 1126, the data storage 1128, the input/output device(s) 1130, and/or other components that may be accessible to the processor 1104. For example, the memory 1126 and/or the data storage 1128 may supplement or supplant the memory 1106 and/or the data storage 1108 entirely or for a particular task or purpose. For example, the memory 1126 and/or the data storage 1128 may be an external data repository (e.g., server farm, array, "cloud," etc.) and allow the device 1102, and/or other devices, to access data thereon. Similarly, the input/output device(s) 1130 may be accessed by the processor 1104 via the human input/output interface 1112 and/or via the communication interface 1110 either directly, via the network 1124, via the network 1120 alone (not shown), or via networks 1124 and 1120.

It should be appreciated that computer readable data may be sent, received, stored, processed, and presented by a variety of components. It should also be appreciated that components illustrated may control other components, whether illustrated herein or otherwise. For example, one the input/output device 1130 may be a router, switch, port, or other communication component such that a particular output of the processor 1104 enables (or disables) the input/output device 1130, which may be associated with the network 1120 and/or network 1124, to allow (or disallow) communications between two or more nodes on the network 1120 and/or network 1124.

Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system to intelligently notify users of call feature activation, the system comprising:
   a processor, wherein the processor comprises at least one processing device; and
   a data storage comprising a storage device;

wherein the processor is configured to:
receive, from a first user device associated with a first user, first instructions to activate a call feature, wherein the call feature comprises one of: a first call-forwarding feature, a bridge/team feature, or a busy-indicator feature;
determine if the call feature affects a second user;
in response to determining that the call feature affects the second user, transmit a notification to the second user, via a second user device, wherein the notification allows the second user to accept or reject the call feature activation;
if the second user accepts the call feature activation, then activate the call feature; and
if the second user rejects the call feature activation, then do not activate the call feature and transmit an indication of the rejection to the first user device.

2. The system of claim 1, wherein the processor is further configured to:
receive, from the first user device, second instructions to deactivate the call feature;
notify the second user, via the second user device, of the deactivation of the call feature; and
deactivate the call feature.

3. The system of claim 1, wherein the first call-forwarding feature indicates the second user as a destination for the first call-forwarding feature, and wherein the processor is further configured to:
receive a call directed to the first user device;
determine that the first call-forwarding feature is activated; and
in response to determining that the first call-forwarding feature is activated, forward the call directed to the first user device to the second user device.

4. The system of claim 1, wherein the processor is further configured to:
receive, from the second user device, a query for all active call features activated on the second user;
determine all the active call features activated on the second user; and
provide, to the second user device, call feature information related to all the active call features activated on the second user.

5. The system of claim 3, wherein the processor is further configured to:
while the first call-forwarding feature is activated, receive, from the second user device, third instructions to activate a second call-forwarding feature, wherein the second call-forwarding feature indicates a third user device associated with a third user as a destination for the second call-forwarding feature;
notify the first user and the third user of the second call-forwarding feature; and
activate the second call-forwarding feature.

6. The system of claim 1, wherein the notification comprises a text message or a SMS (Short Message Service) message.

7. The system of claim 6, wherein a YES reply to the text message indicates acceptance of the call feature activation feature, and wherein a NO reply to the text message indicates rejection of the call feature activation.

8. The system of claim 1, wherein the notification comprises a voice call.

9. A method, comprising:
receiving, from a first user device associated with a first user, first instructions to activate a call feature, wherein the call feature comprises one of: a first call-forwarding feature, a bridge/team feature, or a busy-indicator feature;
determining if the call feature affects a second user;
in response to determining that the call feature affects the second user, transmitting a notification to a second user device associated with the second user, wherein the notification allows the second user to accept or reject;
if the second user accepts the activation of the call feature, then activating the call feature; and
if the second user rejects the activation of the call feature, then not activating the call feature and transmitting an indication of the rejection to the first user device.

10. The method of claim 9, further comprising:
receiving, from the first user device, second instructions to deactivate the call feature;
notifying the second user, via the second user device, of the deactivation of the call feature; and
deactivating the call feature.

11. The method of claim 9, wherein the first call-forwarding feature indicates the second user as a destination for the first call-forwarding feature, and wherein the method further comprises:
receiving a call directed to the first user device;
determining that the first call-forwarding feature is activated; and
in response to determining that the first call-forwarding feature is activated, forwarding the call directed to the first user device to the second user device.

12. The method of claim 9, further comprising:
receiving, from the second user device, a query for all active call features activated on the second user;
determining all the active call features activated on the second user; and
providing, to the second user device, call feature information related to all the active call features activated on the second user.

13. The method of claim 11, further comprising:
while the first call-forwarding feature is activated, receiving, from the second user device, third instructions to activate a second call-forwarding feature, wherein the second call-forwarding feature indicates a third user device associated with a third user as a destination for the second call-forwarding feature;
notifying the first user and the third user of the second call-forwarding feature; and
activating the second call-forwarding feature.

14. The method of claim 9, wherein the notification comprises a text message or a SMS (Short Message Service) message.

15. A method for providing intelligent redirection, the method comprising:
receiving, from a user device, redirection instructions that specify at least one rule for redirecting calls directed to a user associated with the user device;
receiving a call directed to the user;
in response to receiving the call directed to the user, processing the at least one rule for redirecting calls directed to the user to determine at least one destination for the call directed to the user; and
providing an indication to a caller of the call that the call is being redirected.

16. The method of claim 15, wherein the redirection instructions include at least one of: a specific destination based on a caller-ID, ringing multiple destinations simultaneously, ringing multiple destinations in a sequence, a time-of-day rule, an after-hours rule, a date range, and/or a number of rings rule.

17. The method of claim 15,
wherein the indication identifies a new destination of the call.

18. The method of claim 17, further comprising:
receiving an input from the caller indicating that the redirection is rejected; and
in response to the input from the caller that the redirection is rejected, routing the call to a voicemail of the user.

19. The method of claim 15,
wherein the indication provides the caller with one or more options related to the redirection of the call;
receiving an input from the caller indicating a selection of one of the one or more options related to the redirection of the call; and
routing the call based on the selection of one of the one or more options related to the redirection of the call by the caller.

* * * * *

UNITED STATES PATENT AND TRADEMARK OFFICE
CERTIFICATE OF CORRECTION

| | | |
|---|---|---|
| PATENT NO. | : 11,695,873 B2 | Page 1 of 1 |
| APPLICATION NO. | : 17/189573 | |
| DATED | : July 4, 2023 | |
| INVENTOR(S) | : Isha Renavikar, Shahana Mogal and Ananda H P | |

It is certified that error appears in the above-identified patent and that said Letters Patent is hereby corrected as shown below:

In the Claims

At Column 19, Line 61, please delete "feature" therein.

Signed and Sealed this
Twelfth Day of September, 2023

*Katherine Kelly Vidal*

Katherine Kelly Vidal
*Director of the United States Patent and Trademark Office*